April 12, 1955     L. G. HAWKINS     2,705,843
DEVICE FOR TEACHING FRACTIONAL AND DECIMAL ARITHMETIC
Filed Oct. 30, 1953
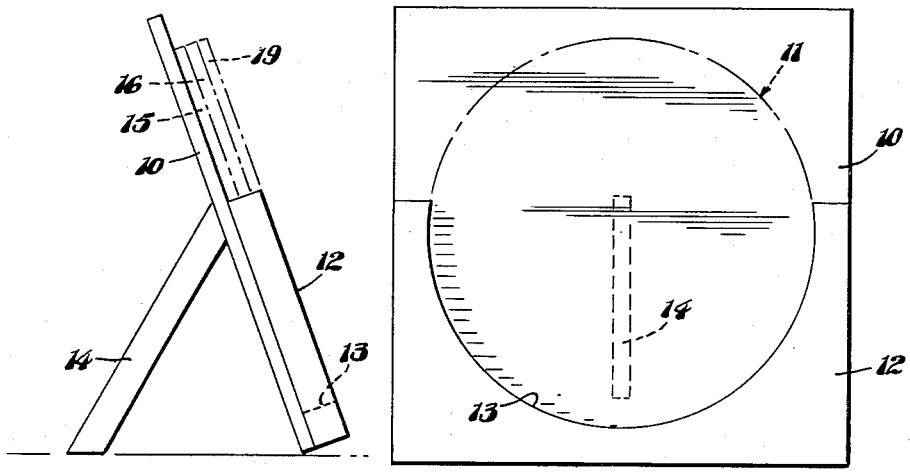
Fig. 1.     Fig. 2.
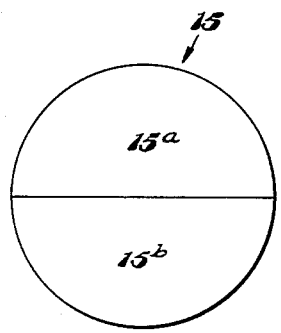 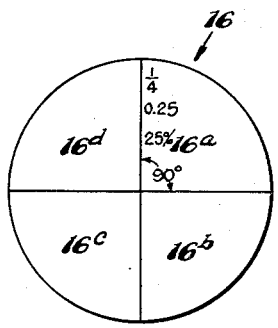 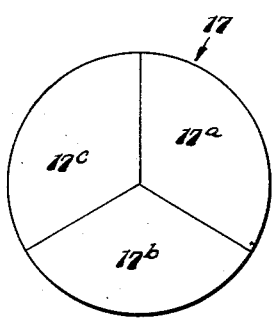
Fig. 3.     Fig. 4.     Fig. 5.
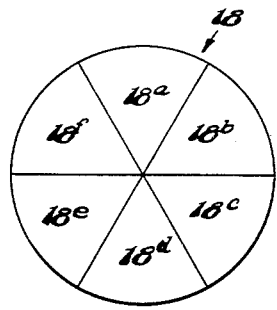 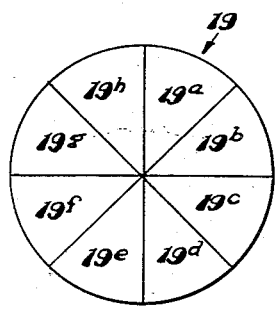
Fig. 6.     Fig. 7.
INVENTOR.
LLOYD G. HAWKINS,
BY:
    Harold B. Hood
          ATTORNEY.

United States Patent Office 2,705,843
Patented Apr. 12, 1955

2,705,843

DEVICE FOR TEACHING FRACTIONAL AND DECIMAL ARITHMETIC

Lloyd G. Hawkins, Spencer, Ind.

Application October 30, 1953, Serial No. 389,398

5 Claims. (Cl. 35—31)

The present invention relates to a device for teaching fractional and decimal arithmetic, and the primary object of the invention is to provide apparatus whereby the relationship between the fractions of various denominations can be readily demonstrated. To that end, I preferably provide an easel equipped with a part-cylindrical shelf, together with a plurality of sectoral pieces, selectively supportable upon the shelved easel, each set of pieces representing a selected fractional denomination, and pieces from one or more sets being usable, separately or in any selected combination, to demonstrate the theory of fractional arithmetic.

A further object of the invention is to mark, design and designate the pieces of the several sets so that they may, if desired, be used also to demonstrate decimal arithmetic, percentages and the plane geometry of circles and their sectors.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation of a preferred form of easel comprising an element of the present invention;

Fig. 2 is a front elevation thereof;

Fig. 3 is an illustration of a set of two sectoral pieces;

Fig. 4 is an illustration of a set of four sectoral pieces;

Fig. 5 is a similar illustration of a set of three sectoral pieces;

Fig. 6 is an illustration of a set of six sectoral pieces; and

Fig. 7 is an illustration of a set of eight sectoral pieces.

In the preferred form of the invention illustrated, I provide an easel 10 upon whose forward face appears an outline of a complete circle 11. A shelf 12 is secured to, or formed integral with, the forward face of the easel 10, and is formed to provide a part-cylindrical surface 13 coincident with a part of the circular outline, projecting perpendicularly from the plane of the front face of the easel 10 and symmetrically arranged with respect to a vertical diameter of the circle 11. Preferably, the peripheral extent of the surface 13 somewhat exceeds 180°; and, if desired, the shelf 12 may be so formed as to provide a complete cylindrical surface, though the illustrated proportions are presently deemed optimum. As shown, a backing leg 14 may be hingedly connected to the rear surface of the easel 10.

The apparatus of the present invention includes a plurality of sets of sectoral pieces, and representative sets are indicated at 15, 16, 17, 18 and 19. Each set comprises a plurality of pieces, the pieces of each set having a common radius equal to the radius of the surface 13, having a common peripheral or angular dimension, and having a common axial thickness; and the sum of the angular dimensions of the pieces of each set will equal 360°. Thus the set 15 comprises two sectoral pieces 15a and 15b, each having an angular dimension of 180°; the set 16 comprises four sectoral pieces, 16a, 16b, 16c and 16d, each having an angular dimension of 90°; the set 17 comprises three pieces, 17a, 17b and 17c, each having an angular dimension of 120°; the set 18 comprises six pieces, 18a, 18b, 18c, 18d, 18e and 18f, each having an angular dimension of 60°; and the set 19 comprises eight pieces, 19a, 19b, 19c, 19d, 19e, 19f, 19g and 19h, each having an angular dimension of 45°. Obviously, other sets, each comprising a different number of pieces, might be added to the equipment.

Preferably each piece of each set will be marked to designate its characteristics. Thus, the piece 16a, for instance, might be marked

¼
.25
25%
90°

The surface 13 has an axial dimension which is substantially a multiple of the axial thickness of each of the sectoral pieces. In the illustrated embodiment of the invention, as will be seen from an inspection of Fig. 1, the depth of the surface 13 is three times the thickness of a sectoral piece, so that pieces from the several sets may be superimposed upon each other, while being supported upon the surface 13.

In use, for instance, the piece 15b might be placed upon the shelf 13, with its upper diametrical edge in a horizontal position. By inspection, the student will see that one-half of the circular outline 11 is now covered by the piece 15b, while the other half of that outline is left uncovered. If, now the pieces 16a and 16d are placed on the easel, with their lower edges resting upon the upper edge of the piece 15b, it will be demonstrated to the understanding of the student that two-fourths, when combined with one-half, constitute a whole. Further to demonstrate the same fact, the pieces 16b and 16c may now be placed on top of the piece 15b, and the student will see that two-fourths will cover, and exactly coincide with, one-half.

Now, for instance, the pieces 19a, 19b, 19g and 19h might be placed on the easel in the arrangement shown in Fig. 7, but with the lower edges of the pieces 19b and 19g resting upon the upper edges of the pieces 16b and 16c. The student will thereby be shown that four-eighths equal one-half. If the pieces 19c and 19d are now superimposed upon the piece 16b, the student will be shown that two-eighths equal one-fourth.

If, now, the pieces 19a, 19b, 19g and 19h are removed and the pieces 18a, 18b and 18f are substituted therefor, the student will perceive that three-sixths are equal to four-eighths and two-fourths to one-half.

If the piece 17b is placed on the easel, supported upon the shelf 13 and in a position symmetrical with respect to a vertical diameter of the circle 11, and if that piece is then covered by, for instance, the pieces 18c and 18d, the equality of two-sixths and one-third will be demonstrated. If the piece 17b is moved, in the shelf 13, until one of its edges coincides with a horizontal diameter of the circle 11, and if one of the pieces of the set 18 is then placed on the shelf with an edge in contact with the other edge of the piece 17b, the student will perceive that the remote edge of the piece from the 18 series likewise coincides with the horizontal diameter of the circle 11, and will thereby be shown that one-sixth plus one-third equals one-half.

The other combinations in which the various pieces of the several sets may be used coincidentally, either in a common plane or in superimposed relation while supported by the surface 13, will readily be perceived by the reader, as will the manner in which decimal arithmetic, percentages and the plane geometry of circles may be demonstrated through the use of the apparatus herein disclosed.

I claim as my invention:

1. In a device of the class described, an easel, a part-circular shelf having a peripheral extent exceeding 180° secured to the forward face of said easel and projecting forwardly therefrom to provide a part-cylindrical surface substantially perpendicular to said forward face, and a plurality of sets of inserts, each such set comprising a plurality of sectoral pieces having radial dimensions equal to a radius of said part-cylindrical surface and having a common angular dimension, the sum of the angular dimensions of each set totalling 360°, and the angular dimension of one piece of at least one set equalling the sum of the angular dimensions of a plurality of pieces of at least one other set.

2. In a device of the class described, an easel, a part-circular shelf having a peripheral extent exceeding 180° secured to the forward face of said easel and projecting forwardly therefrom to provide a part-cylindrical surface substantially perpendicular to said forward face, and a plurality of sets of inserts, each such set comprising a plurality of sectoral pieces having radial dimensions equal to a radius of said part-cylindrical surface and having a common angular dimension, the sum of the angular dimensions of each set totalling 360°, the angular dimension of one piece of at least one set equalling the sum of the angular dimensions of a plurality of pieces of at least one other set, the pieces of each set having a common axial thickness, and the axial depth of said part-cylindrical surface being substantially equal to the sum of the axial thicknesses of a piece of each of a plurality of sets.

3. In a device of the class described, an easel, a part-circular shelf having a peripheral extent exceeding 180° secured to the forward face of said easel and projecting forwardly therefrom to provide a part-cylindrical surface substantially perpendicular to said forward face, and a plurality of sets of inserts, one set consisting of two pieces, one set consisting of three pieces, one set consisting of four pieces, one set consisting of six pieces, and one set consisting of eight pieces, the pieces of each set being identically sectoral, having radial dimensions equal to a radius of said part-cylindrical surface, and having angular dimensions totalling 360°.

4. The device of claim 3 in which the pieces of each set have a common axial thickness, the axial depth of said part-cylindrical surface being substantially equal to the sum of the axial thicknesses of a piece of each of a plurality of sets.

5. In a device of the class described, an easel displaying on its forward face an outline of a circle, a part-circular shelf having a peripheral extent exceeding 180° projecting forwardly from said easel face, said shelf providing a part-cylindrical surface coincident with a part of said outline and symmetrically arranged with respect to a vertical diameter of said circle, and a plurality of sets of inserts, each such set comprising a plurality of sectoral pieces having radial dimensions equal to a radius of said part-cylindrical surface and having a common angular dimension, the sum of the angular dimensions of each set totalling 360°, the pieces of each set having a common axial thickness, and the axial depth of said part-cylindrical surface being substantially equal to the sum of the axial thicknesses of a piece of each of a plurality of sets.

References Cited in the file of this patent

UNITED STATES PATENTS 2,611,193   Davis ................ Sept. 23, 1952

FOREIGN PATENTS 162,372   Great Britain ............ Apr. 26, 1921
242,524   Great Britain ............ Nov. 12, 1925